United States Patent
Rice et al.

(10) Patent No.: US 7,730,025 B1
(45) Date of Patent: Jun. 1, 2010

(54) MIGRATING DOCUMENTS

(75) Inventors: John Michael Rice, Bettytown (IE); Michael Timothy Hayes, Tralee (IE)

(73) Assignee: Oracle America, Inc., Santa Clara, CA (US)

( * ) Notice: Subject to any disclaimer, the term of this patent is extended or adjusted under 35 U.S.C. 154(b) by 1325 days.

(21) Appl. No.: 10/999,597

(22) Filed: Nov. 30, 2004

(51) Int. Cl.
*G06F 7/00* (2006.01)

(52) U.S. Cl. ........................ 707/609; 707/602; 707/690; 707/691; 715/249

(58) Field of Classification Search ................ 707/200, 707/203, 204, 999.2, 999.203, 999.204; 715/249
See application file for complete search history.

(56) References Cited

U.S. PATENT DOCUMENTS 4,503,516 A * 3/1985 Agnew et al. .................. 704/3
6,934,909 B2 * 8/2005 Tewari ......................... 715/234
2003/0188036 A1 * 10/2003 Chen et al. ................... 709/310

OTHER PUBLICATIONS

"A Technical White Paper Sep. 2004" *Sun Java™ Desktop System: Microsoft Migration and Interoperability Guide*.
"First Commercial Office Suite to Use OASIS OpenDocument File Format" *Sun Introduces New Version of StarOffice Software*; www.sun.com/smi/Press/sunflash/2005-09/sunflash.2050927.

* cited by examiner

*Primary Examiner*—Hung Q Pham
(74) *Attorney, Agent, or Firm*—Meyertons, Hood, Kivlin, Kowert & Goetzel, P.C.

(57) ABSTRACT

A source document set including one or more source documents to be migrated from a source application package to a destination application package can be analyzed for migration issues. The migration issues can be reported to a user and/or resolved prior to migration by software. Software can also be provided for the extraction of a source macro from a source document, parsing of the source macro, mapping of specific source APIs to destination APIs and the generation of destination macro code.

24 Claims, 15 Drawing Sheets

FIG. 5

Text A Document Before Preparation - Notice Header Is Squashed

Text B Document After Preparation - Notice Header Is Now In Original Shape

MIGRATING DOCUMENTS

BACKGROUND OF THE INVENTION

The present invention relates to document migration.

Some application packages support the importing, or migration of documents from other application packages. For example, the StarOffice™ application package supports the importation of documents from various other application packages, including Microsoft® Office application packages from Microsoft Corporation.

In many instances, the importation or migration of the documents can be achieved without any issues. However, sometimes issues may be encountered. Such issues can be caused, for example, due to particular formatting, or the presence of embedded code, macros, etc. Where a single document is to be migrated, this can typically be addressed by appropriate measures before and/or after the migration.

However, where a large number of documents are to be migrated, potential migration issues and the potential costs associated with such issues may not readily be apparent to the user. To investigate such matters manually would be very time consuming and it would not be possible from such a manual approach to obtain an accurate assessment of the number and extent of such potential migration issues, and also of the cost of addressing such issues.

Accordingly, the present invention seeks to facilitate migration by addressing such issues by assisting in the assessment and consequently the addressing of any such migration issues.

SUMMARY OF THE INVENTION

An embodiment of the invention can provide a computer-implemented method of analyzing a source document set to be migrated. The source document set can include one or more source documents of a source document type (e.g., Microsoft Word) associated with a source application package (e.g., Microsoft Office) to be migrated to a respective destination document of a corresponding destination document type associated with a destination application package (e.g., StarOffice). The computer-implemented method can include, for each source document, software opening the source document, analyzing the source document to identify migration issues associated with migration of the source document, closing the source document and generating a record of the result of the analysis.

A further embodiment can provide a method of migrating such documents. The computer-implemented method can include software running an analysis engine to analyze a source document set to be migrated for migration issues. The computer-implemented method can further include software flagging migration issues, performing document migration and generating a log of migrated documents.

The analysis engine can be operable to enable identification of the source document set to be migrated, to open the first source document, to analyze the first source document to identify migration issues associated with migration of the first source document, to close the first source document and to generate a record of the result of the analysis.

Where a specific migration issue has been identified in the source document, a preparation engine may be run to modify the source document so that it will migrate without issue. The preparation engine can take as its set of documents to be prepared, those which have been analyzed and shown to have preparable issues.

Another embodiment of the invention can provide a computer-implemented method of migrating a source document of a source document type associated with a source application package to a destination document of a destination document type associated with a destination application package. The source document can include a source macro in a source language. The computer-implemented method can include software extracting the source macro from the source document, parsing the source macro, mapping specific source application programming interfaces (APIs) to destination APIs and generating destination macro code.

Other embodiments of the invention can provide a computer system operable to implement the aforementioned methods. Further embodiments of the invention can also provide a computer program product for carrying out the aforementioned methods. A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

BRIEF DESCRIPTION OF THE DRAWINGS

Embodiments of the present invention will be described hereinafter, by way of example only, with reference to the accompanying drawings in which like reference signs relate to like elements and in which:

FIG. 5 illustrates example screenshots of the results of an analysis of migration issues;

Figure 1:
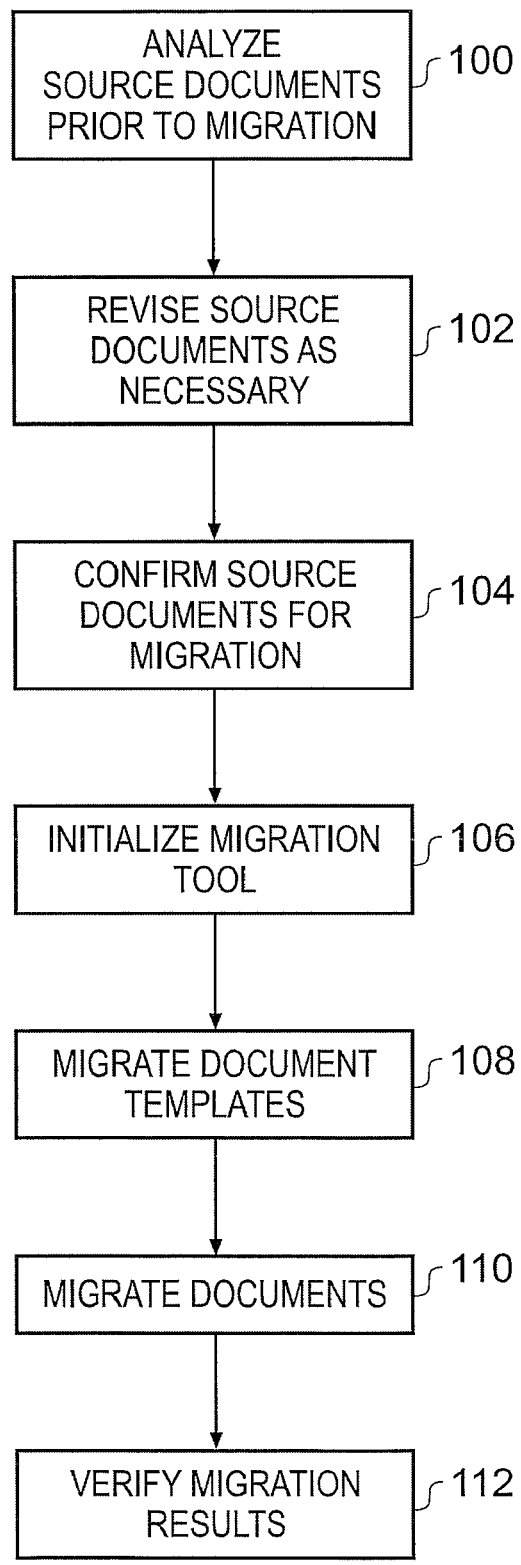
FIG. 1 is a flow diagram illustrating an example of a method of migrating a document.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DESCRIPTION OF PARTICULAR EMBODIMENTS

The present invention relates to the migration of documents between formats for respective application packages. An example of the invention will be described hereinafter with reference to the migration of Microsoft Office documents as an example of source documents for a source application package, and to StarOffice documents as an example of destination documents for a destination application package. These examples of application packages are not to be taken as limiting, however, and it will be appreciated that the invention could be applied to the migration between respective documents of other application packages. One or more document types may be provided within an application package. For example, different document types for Microsoft Office documents include Word, Excel and Power Point documents.

An overview of a migration process for migrating documents between application packages is illustrated in FIG. 1.

At 100, a specified set of source documents can be analyzed to identify any potential migration issues prior to migration. An example implementation of this step will be described in more detail with reference to FIGS. 2 to 4. This analysis can identify any documents having potential migration issues and the cost of rectifying those issues.

At 102, the source documents can be revised as appropriate using the results of the analysis to rectify migration issues identified at 100.

At 104, the source documents to be migrated can be confirmed. For example, it may be determined that not all of the source documents that were analyzed in step 100 are to be migrated.

At 106, a migration tool is initialized. In one example, the migration tool is initialized by a command line instruction. Alternatively, it can be initialized by means of a graphical user interface (GUI). The GUI could provide a real time representation of the collection of source documents to migrate, the collection of destination migrated documents, a log file of the migration and a progress window to indicate progress of migration.

At 108, the migration tool can be operable initially to migrate source document templates into destination document templates. A log recording the document template migration can be maintained. If the analysis performed at 100 above is arranged to note associations between templates and documents, then the template migration can be configured to occur automatically. Templates may contain macros that are used in user documents. Symbol tables can be built up for the template documents that contain macros and these can be stored for future reference when a source document is being migrated that contains a matching attached or global template. Attached template macros can be copied into migrated documents, whilst global template macros can be saved as external global macro libraries.

At 110, the migration tool can then be operable to migrate the source documents into destination documents. A log recording the document migration can be maintained.

At 112, the migration results can be verified using the migration log.

The source documents to be migrated can be scanned for viruses during this process, for example using an external virus scanner. Alternatively, or in addition, during the analysis at 100, potentially dangerous API calls, such as file manipulation or registry modification calls could be identified and marked.

Figure 2:
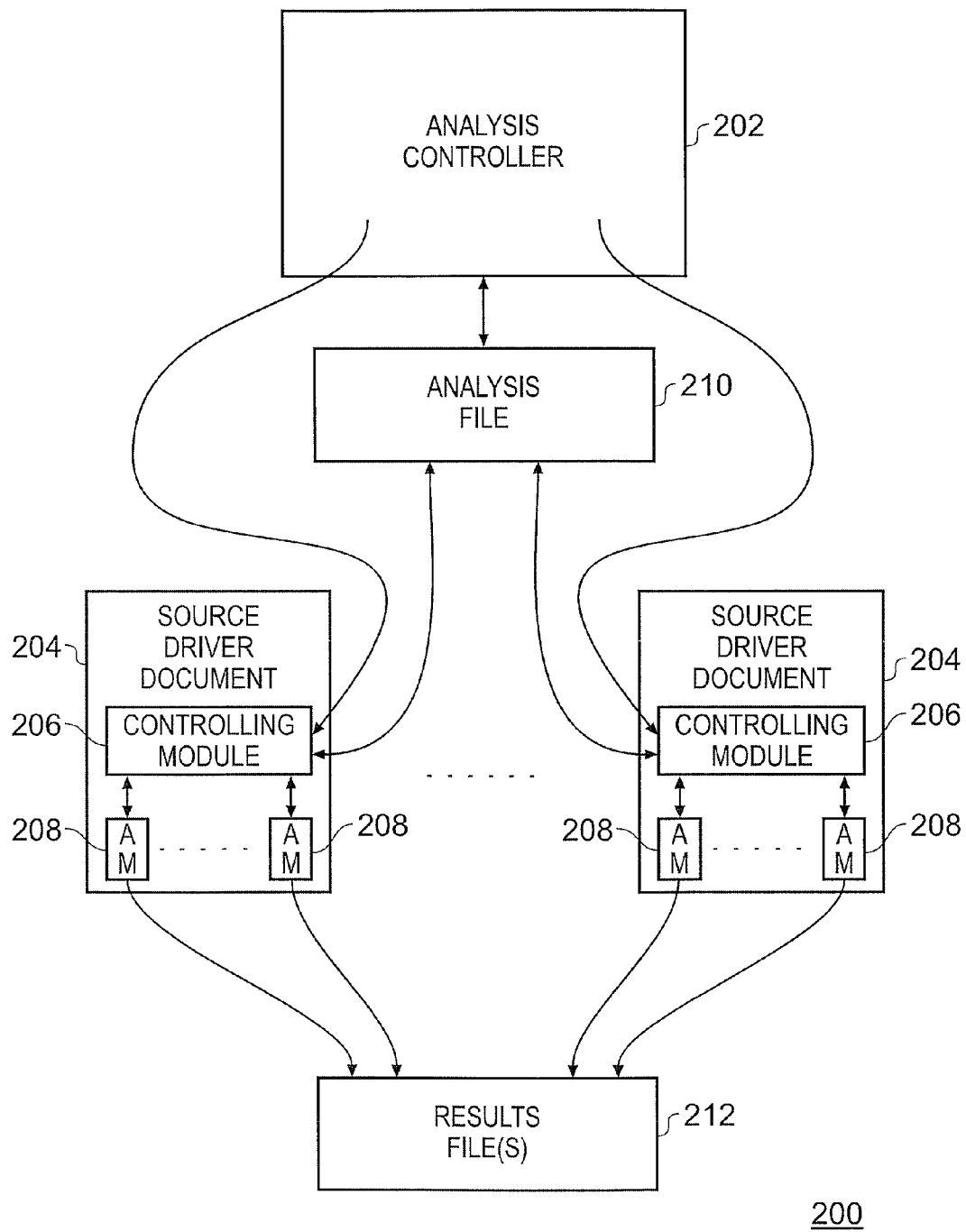
FIG. 2 is a schematic block diagram of an example of an analysis engine for analyzing documents for migration issues.

FIG. 2 is a schematic representation of an analysis engine 200 carrying out the analysis step 100 of FIG. 1.

The analysis engine 200 comprises an analysis controller 202 and a source driver document 204 for each source document type.

The analysis controller 202 is responsible for assembling the input parameters for analysis by guiding the user through a process of identifying the documents to be analyzed and a location at which the analysis results are to be stored. The analysis controller can also be configured to enable the user to specify one or more document types to be analyzed. For example, if the source documents are Microsoft Office documents, then the user can be given the option of analyzing one or more of Word documents, Excel documents and Power-Point documents. After collection of the input parameters, these can be stored in an analysis file 210.

Figure 3:
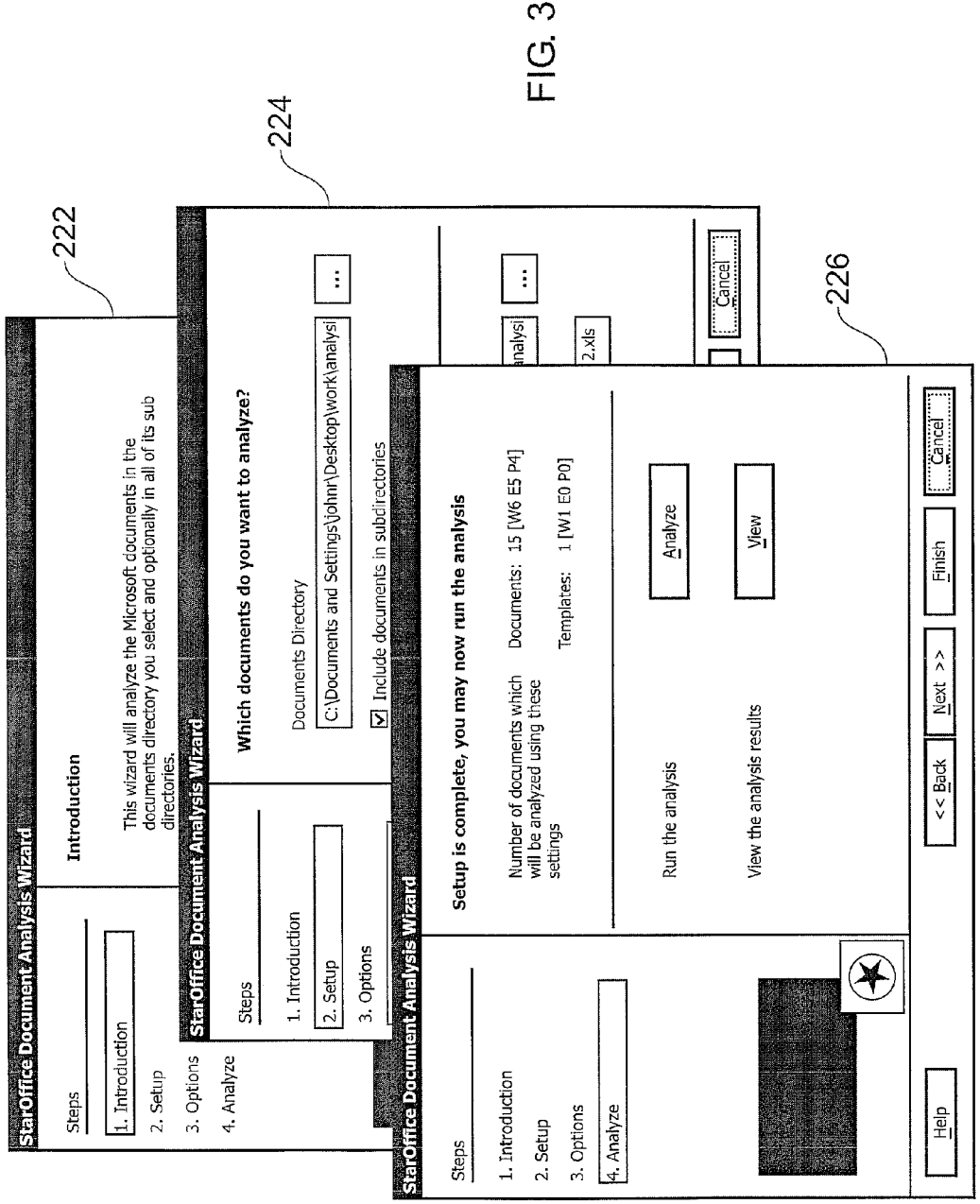
FIG. 3 illustrates example screenshots of an example of a wizard for use in the analysis of migration issues.

The analysis controller 202 can be implemented in the form of a wizard. FIG. 3 is a representation of three different shots of screens 222, 224, 226 that can be presented to the user by the wizard to provide an introduction to the wizard (screen 222), to enable the selection of the documents to be analyzed and the location at which the results are to be stored (screen 224) and a summary of the documents selected (screen 226).

The analysis controller 202 is operable to control the invocation of the analysis of the source documents to be analyzed. For each type of document that the user has selected, and for which documents are to be analyzed, the analysis controller 202 opens an appropriate source driver document and invokes a controlling module 206 in the source driver document concerned. The analysis of the documents of that type is then carried out by the appropriate source driver document 204. The source driver for a source document type can be made visible to a user during analysis of a source document of that document type. The analysis of the source documents is performed one by one, with each source document being opened, analyzed and then closed in turn before proceeding to the next source document.

Each source driver document 204 includes the top level controlling module 206 and one or more analyzer modules 208. The controlling module 206 controls the invocation of the respective analyzer modules 208. Each of the analyzer modules 208 is operable to perform an analysis of a source document to identify one or more potential migration issues associated with the migration of that source document. The controlling module 206 and the analyzer modules 208 can be written as respective macros in an appropriate source application macro language.

The controlling module 206 gets the input settings, determines the list of documents to be analyzed and then analyzes each source document in turn by calling the analyzer modules 208 and identifying one or more results files 212 into which the analysis results for the document are to be stored.

An analyzer module 208 opens the source document, determines the general document properties for that document and then analyzes it for all of potential analysis issues, by calling various analysis functions, which can be both application specific and common. The document information is stored in the results file(s) 212. All of the analysis functions store any analysis issues detected in the results file(s) 212. When the analysis for a document is completed the document is closed and the function returns to the controlling module 206.

After all of the documents have been analyzed the controlling module 206 can then cause the results collected in the results file 212 to be output in a spreadsheet, or as an XML file, for example.

Figure 4:
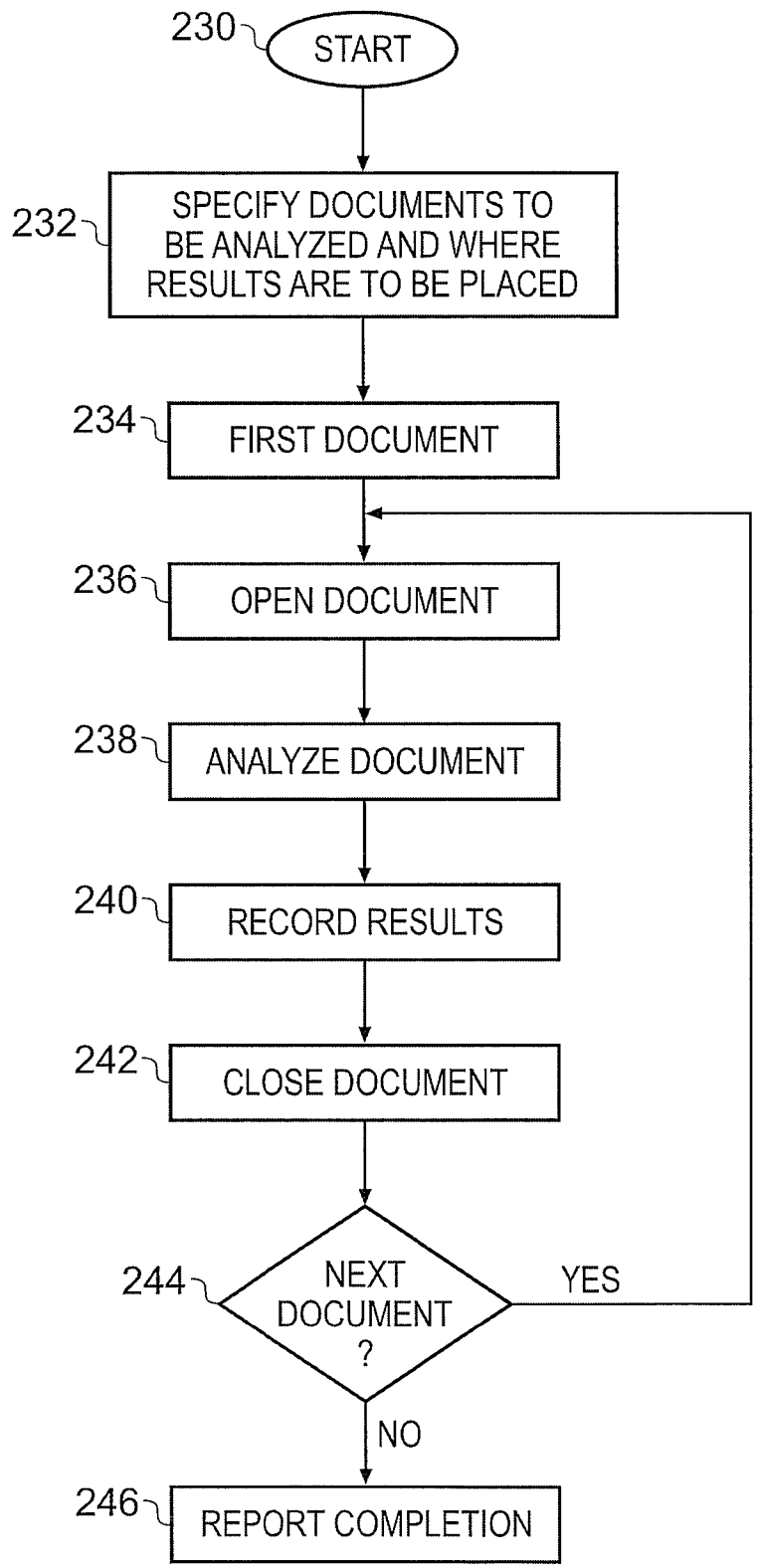
FIG. 4 is a flow diagram of an example of a method of analyzing documents for migration issues.

FIG. 4 is a flow diagram of an example of a method of analyzing documents for migration issues. This method can form an example the operation of the analysis engine 200 of FIG. 2 and illustrate step 100 of FIG. 1 in more detail.

At 230, the analysis step 100 is started.

At 232, the analysis controller 202 (the analysis wizard) prompts the user to identify the documents to be analyzed and a location at which the analysis results are to be stored.

At 234, a first document is selected.

At 236, the document is opened.

At 238, the document is analyzed by the source application macros in the source driver document for the document type concerned.

At 240, the results are recorded. The results can be collated in, for example, a spreadsheet, or in an eXtended Markup Language (XML) document at the location identified by the user.

At 242, the document is closed.

At 244, if there is a next document to be analyzed, then control returns to step 206. Otherwise the completion of the analysis is reported at 246, and the user is able to review the analysis results.

Figure 5:
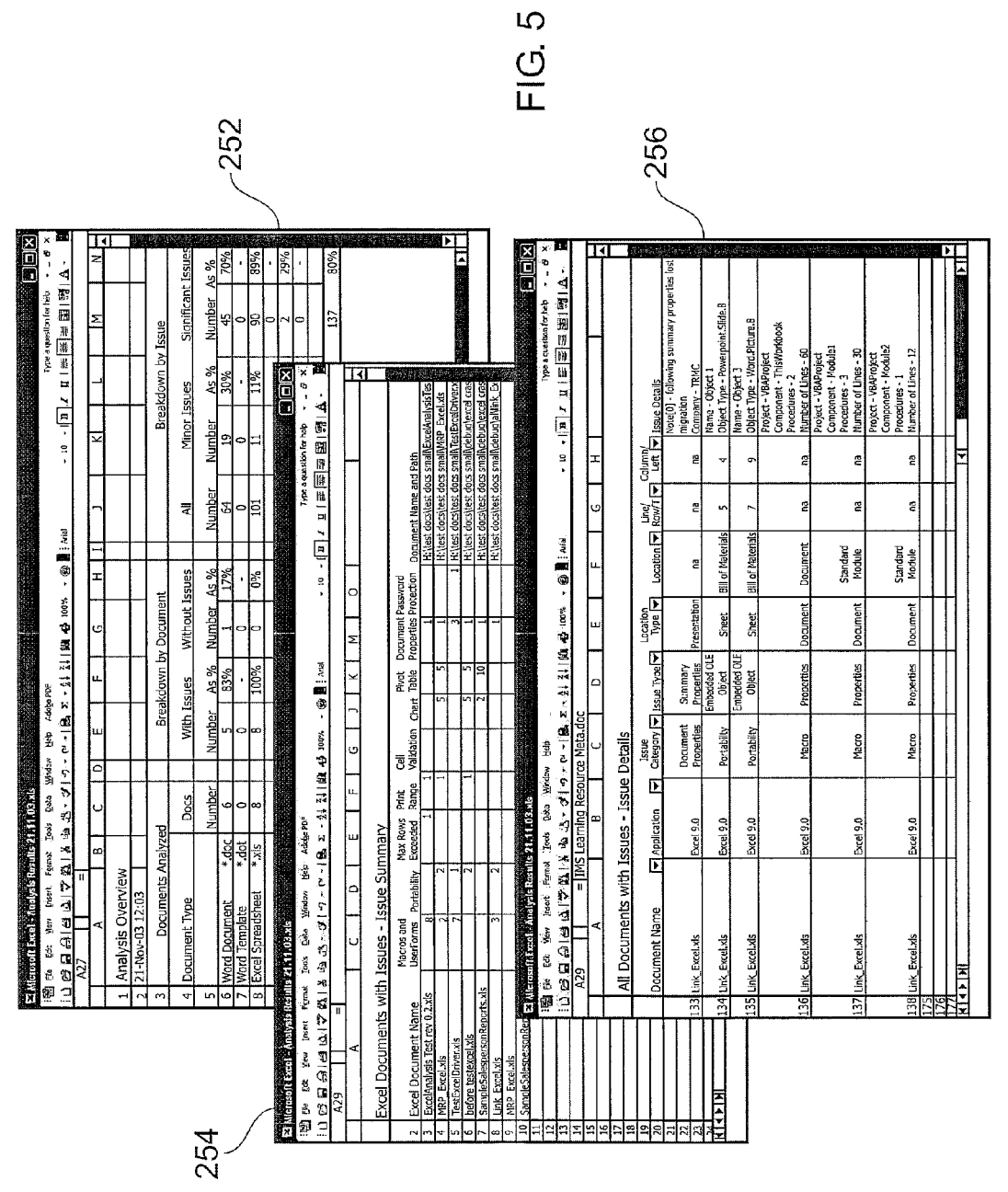

FIG. 5 illustrates three examples of screen shots 252, 254, 256 of analysis results. For example, these can include an overview screen 252 summarizing the analysis results, a screen 254 summarizing migration issues and a screen 256 giving details of the migration issues.

The overview spreadsheet shown at 252 in FIG. 5 gives an overview of all the documents analyzed, the modification dates, any possible macro migration issues, any possible document migration issues and their estimated cost to migrate them. Graphs and tables can be used to allow a user easily to understand the data produced. Document modification dates can give an indication of which documents really need to be migrated, and which documents can be archived. For example, documents that are identified as over 1 year old could be suitable for archiving The macro migrations issues can identify which macros need to be migrated by helping to distinguish various types of macros from simple to more complex macros. The level of macro complexity is relevant to determining the cost of the macro migration. Unique macro modules can be identified, a hash of the macro module can be computed and a list of unique macro hash codes can be built up. In this way the number of unique macro modules to be migrated can be identified. In many cases, macros can be included in a template and if documents are created from the template, these macro modules will be duplicated. If a collection of such documents were analyzed, a very high macro count could be obtained if only occurrences of macro modules were counted, as opposed to unique macro modules across all the documents analyzed.

The document migration issues can identify documents with particular migration issues that may best not be migrated at a particular time, bearing in mind that import filters are always being improved. Although most documents can be migrated without issue or perhaps with a minor cosmetic issue, many minor issues are very simple for a user to fix manually, rather than having specifically to migrate the documents.

The migration costs can indicate cost in terms of time and/or money needed to migrate documents with migration issues. For manual macro migration costs, costing can be based on a number of lines to be manually modified to make them suitable for migration. A significant proportion of macros with potential migration issues can be migrated automatically. The percentage conversion will typically increase with time as additional mappings are provided for mapping additional source language APIs to destination language APIs, etc.

The spreadsheet shown at 254 in FIG. 5 summarizing migration issues can give a detailed list of the issues of most concern during a migration. The issues can, for example, be sorted by application and then by issue category. For each issue, a detailed breakdown of its cost, an issue status, a detailed comment and any possible ways of working around the issue can be given. At the end of each application, the total cost for the issues identified in this application can be added together to give a total cost.

The spreadsheet shown at 256 in FIG. 5 giving details of the migration issues can give detailed guidance on the various issues so they can be addressed. This information can be given for each detected issue. Each issue can have specific information describing where the issue occurred and other attributes and notes relevant to understanding and resolving the issue. The issue can be sorted by using the filters that are in every column. This is helpful to search for certain issues. Columns can give advanced details of each issue. The exact location (document name and path, page number and line number, if applicable) can be stated, the issue category and type can be given and an advanced description of the issue details can be displayed.

In the following some examples of potential document issues are given.

Where blank lines are occur in the body of the document with a header style that is picked up in a table of contents (TOC), this might lead to incorrect numbering in the TOC. The analysis engine can be arranged to detect this and to list the lines in question. The user can then open the document and modify the style settings for these blank lines.

External references can lead to potential migration issues. The analysis engine can be arranged to identify the use of external references in macros to Windows API's and other Windows automation services.

It can happen that graphics and frames of a certain size in headers and footers can become misplaced or out of shape during migration if no action is taken. The analysis engine can enable such issues to be identified.

Figure 6:
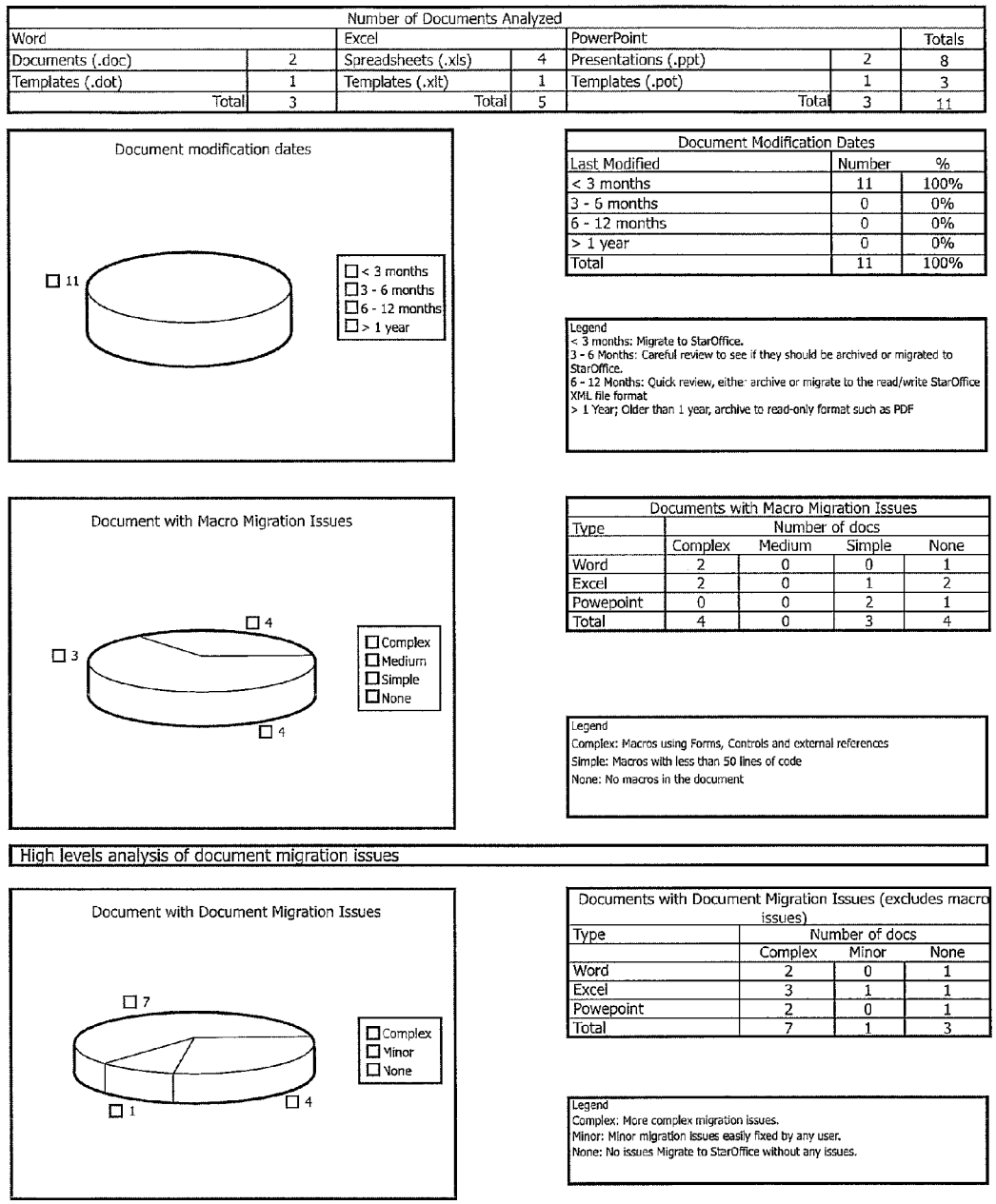
FIG. 6 includes an alternative example of the representation of the results of an analysis of migration issues.

As an alternative to the detailed spreadsheets shown in FIG. 5, or in addition thereto, information can be displayed in a graphical form, for example using pie charts, as shown in FIG. 6.

Table 1 below represents an example workflow for the analysis process of FIG. 4, employing a Document Analysis Wizard (DAW) as an analysis controller 202. In this example, input parameters collected by the DAW are saved in a file called DAW install dir>\resources\<locale>\analysis.ini. An analysis driver module called AnalyzeDirectory( ) forms a controlling module 206 of the source driver document 204. A MigrationAnalyzer module 208 called DoAnalyze( ) forms an analysis module in the source driver document 204. In this example, the results of the analysis are stored as an XML document.

TABLE 1

Start of Table 1
    DAW is launched
        Input Parameters for Analysis - user follows steps in wizard to specify document
            input directory, type of documents to process, results directory and name of
            results file.
        Run Analysis - user clicks on Run.
            The input parameters are saved to an analysis.ini file in <DAW install
            dir>\resources\<locale>\analysis.ini
            For each type of document which the user has selected and for which
                documents need to be analyzed the DAW opens the appropriate driver
                document and invokes the AnalysisDriver module AnalyzeDirectory( ) sub.
            AnalyzeDirectory( )
                This sub gets the input settings, determines the list of documents to be
                    analyzed and then analyzes each in turn by calling the MigrationAnalyzer
                    module DoAnalyze( ) function, passing in a DocumentAnalysis object in
                    which to store the analysis results for the document. The results for all the
                    documents are stored in the AnalyzedDocs collection.
                DoAnalyze( )
                    This function opens the document, determines its general document
                        properties and then analyzes it for all of the Analysis issues, by calling
                        the various Analysis functions both application specific and common.
                        It stores the document information in the DocumentAnalysis object
                        passed into it by the AnalyzeDirectory( ) sub. All of the analysis
                        functions store all of the analysis issues detected in an IssuesInfo object
                        and add it to the DocumentAnalysis objects Issues collection.
                  When the analysis for a document is completed the document is closed
                      and the function returns.
            After all of the documents have been analyzed the AnalyzeDirectory( ) then
                calls WriteXMLOutput( ) sub, passing in the AnalyzedDocs results
                collection, to write out the results as XML output.
            XML is output only if the outputtype=both or outputtype=xml property
                is set in the analysis.ini file. The DAW does not expose this setting in
                the UI. The xml file generated is placed at: \
                spreadsheet name>_<application>.xml. A separate XML file is
                generated for each document type, unlike the results spreadsheet which
                amalgamates all of the document type results into one results
                spreadsheet.
            Once this returns AnalyzeDirectory( ) calls WriteXSLOutput( ) sub to
                write out the results to the results spreadsheet.
                WriteXSLOutput( )
                    Opens the results spreadsheet or creates a new one, then writes out
                      the results to the various sheets of the spreadsheet.
            After all of the documents have been analyzed for this document type and the
                results written out the AnalyzeDirectory( ) sub returns.
            Next document type driver document is opened and its AnalyzeDirectory( ) sub
                invoked.
        All document types have been analyzed and their results output to the results
            spreadsheet and/or xml output files.
        View Results - user clicks on View.
            The results spreadsheet is opened for the user to review.
    User can close the results spreadsheet, navigate back in the DAW to change some
        settings and rerun the DAW analysis if they wish.
    DAW is closed.
End of Table 1

Returning to FIG. 1, following the analysis of the source documents in step 100, the option can be given to the user to revise the source documents as appropriate. This can be done manually by the user, or it can be done, in so far as this is possible, automatically by a preparation engine, which can, for example, form part of or include the analysis engine.

Figure 7:
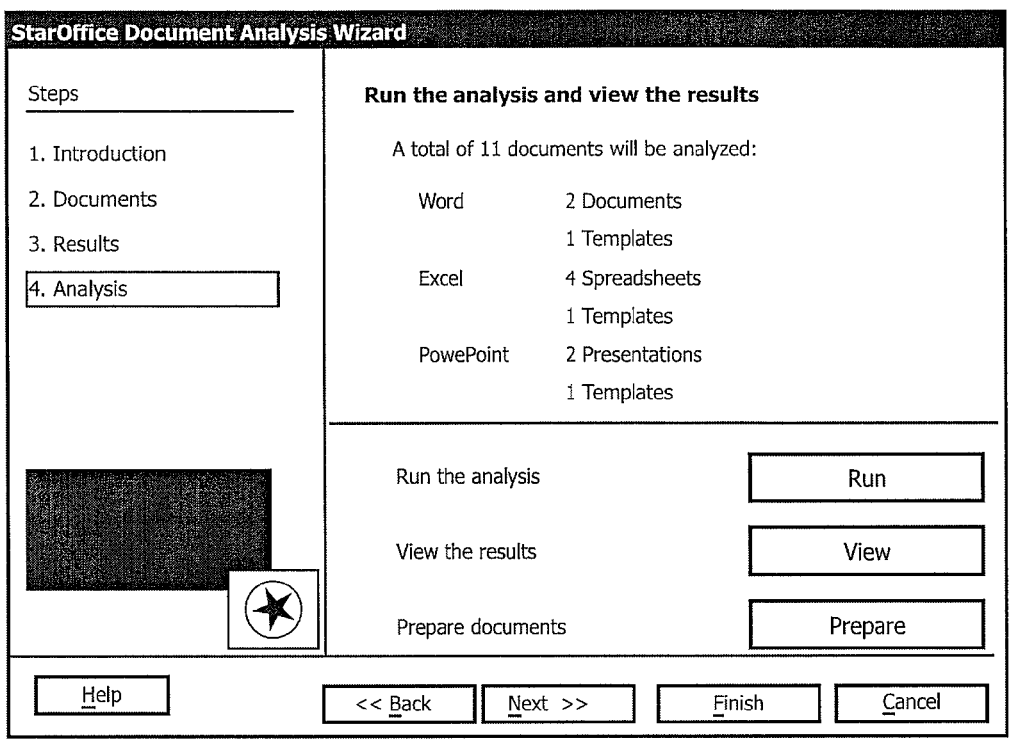
FIG. 7 illustrates an example screenshot of an example of a wizard for use in the analysis and preparation of documents to mitigate migration issues.

FIG. 7 illustrates a variant of the third Wizard screen 226 illustrated in FIG. 3. In this variant, the wizard screen shown in FIG. 7 includes a "prepare button" that can be activated once an analysis results spreadsheet has been created.

Where a specific migration issue has been identified in the source document, an analysis engine that additionally provides for the preparation of documents to mitigate migration issues. An example of such an analysis and preparation engine may be run to modify the source document, or a copy thereof so that it will migrate without issue.

An example of such an analysis and preparation engine can takes as its set of documents to be prepared, those which have been analyzed and shown to have preparable issues. In other words, an analysis can be carried out on a document set before any of the documents are prepared.

Once a preparation set has been identified, the preparation portion of the engine can be run. In one example, the preparation engine copies each of the source documents to be prepared and then runs a set of preparation macros against the document to be prepared using a source driver document, for each preparable issue identified by the analysis. These preparation macros make use of the source document's native API to modify it in such a way that the identified migration issue is removed, without noticeably altering the visible format, layout or content of the document.

Figure 8:
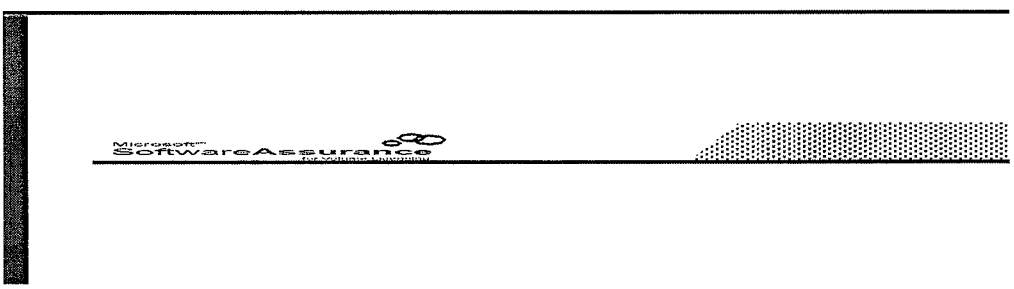
FIG. 8 illustrates an example of a header with a migration issue.
Figure 9:
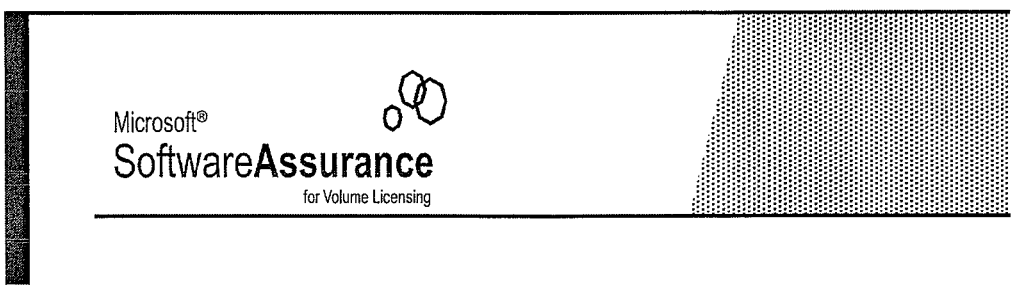
FIG. 9 illustrates the example of FIG. 8 after preparation of the document to rectify the migration issue.

For instance, if there is a graphic in a header of the source that is larger than the Header available in the destination document, it might be squashed on migration into the destination document as illustrated, for example in FIG. 8. This issue can be flagged during analysis and can be prepared (that is it can be modified in the source document, or in a copy thereof, in such a way that it can be migrated without an issue into the destination document. The preparation macro will add in additional line returns to the header so the header size matches the size of the graphic. There would be no visible change to the document, but on migration the graphic will appear normally in the header and will not be squashed, as represented, for example, in FIG. 9.

Activation of the prepare button can allow a user optionally to prepare copies of the source documents that have been marked as having preparable issues in the results spreadsheet. In this example, the prepare button is only enabled when there is a results spreadsheet and the view button is enabled.

As described above, an analysis is conducted in respect of a set of documents and then those documents with preparable migration issues can be subjected to preparation (i.e. they can be copied and modified) to rectify the migration issues. However, in another example, each document that is found to have preparable issues could then be subjected to preparation (i.e. it can be copied and modified) to rectify the migration issues before a next document is analyzed.

Figure 10:
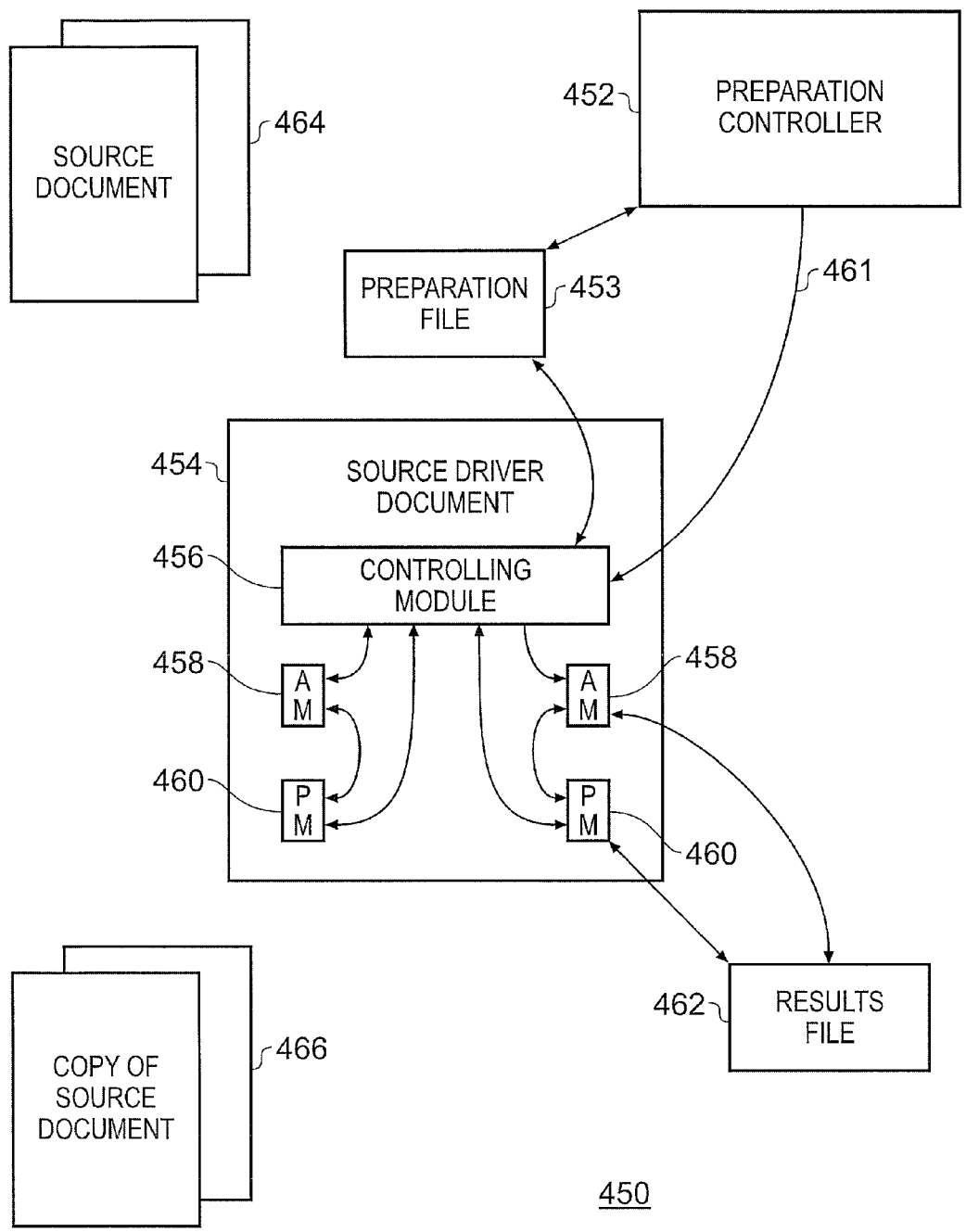
FIG. 10 is a schematic block diagram of an example of an analysis and preparation engine for analyzing and preparing documents to mitigate migration issues.

FIG. 10 is a schematic representation of a preparation engine 450 for carrying out the preparation, which can be performed as step 102 of FIG. 1.

The preparation engine 450 comprises a preparation controller 452 and a source driver document 454 for each source document type. In FIG. 10, only one source driver document is shown.

The preparation controller 452 is responsible for assembling the input parameters for preparation by guiding the user through a process of identifying the documents to be analyzed for preparation and a location at which the analysis results are to be stored. The analysis controller can also be configured to enable the user to specify one or more document types to be analyzed. For example, if the source documents are Microsoft Office documents, then the user can be given the option of analyzing one or more of Word documents, Excel documents and PowerPoint documents. After collection of the input parameters, these can be stored in a preparation file 453.

The preparation controller 452 can be implemented in the form of a wizard, of which FIG. 7 represents one of the screens that can be presented to the user by the wizard.

The preparation controller 452 is operable to control the invocation of the analysis of the source documents to be analyzed for preparation. For each type of document that the user has selected, and for which documents are to be analyzed, the preparation controller 452 opens an appropriate source driver document and invokes a controlling module 456 in the source driver document concerned. The analysis of the documents of that type, and also the preparation of those documents that are identified as being preparable to avoid migration issues, is then carried out by the appropriate source driver document 454.

Each source driver document 454 includes the top level controlling module 456, one or more analyzer modules 458 and one or more preparation modules. The controlling module 456 can be operable to control the invocation of the analyzer and/or preparation modules 458.

The controlling module 456 gets the input settings, determines the list of documents to be analyzed and then analyzes each source document in turn by calling the analyzer modules and identifying one or more results files 462 into which the analysis results for the document are to be stored.

Each of the analyzer modules 458 is operable to perform an analysis of a source document to identify one or more potential migration issues associated with the migration of that source document.

After a document has been analyzed, if it contains any migration issues that are deemed to be preparable (i.e. rectifiable so that on migration the issue is no longer present) the appropriate preparation module 460 can be operable to prepare the document to rectify the migration issue. The preparation modules 460 could be invoked by the controlling module 456 and/or by one of the analyzer modules 458. When preparing a document, a copy 466 of the source document 464 can be prepared, and then the preparation can be performed on the copy 466 of the source document.

The controlling module 456, the analyzer modules 458 and the preparation modules 460 can be written as respective macros in an appropriate source application macro language.

The analysis and/or preparation of the source documents can be performed one by one, with each source document being opened, analyzed and then closed in turn before proceeding to the next source document.

It will be appreciated that the analysis engine 200 of FIG. 2 and the preparation engine 450 of FIG. 10 have a lot in common. Indeed, where the present invention is implemented in software, the preparation controller and the analysis controller could be integrated into engine that performs both functions with modules being shared, where appropriate, between functions. Moreover, the term analysis engine could be applied equally to the preparation engine 450 of FIG. 10. Similarly, the term analysis controller could be applied to the preparation controller 452 of FIG. 10.

Figure 12:
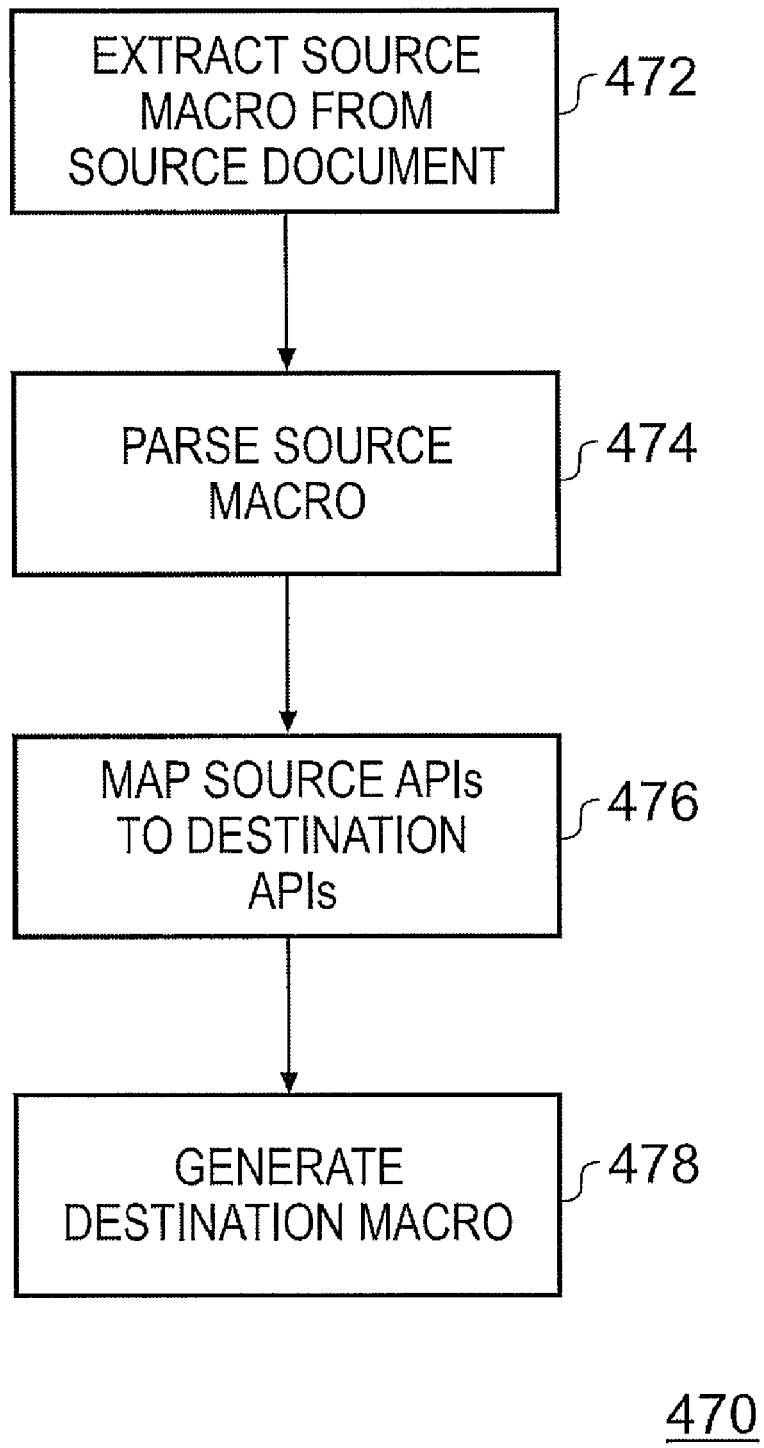
FIG. 12 is a flow diagram of an example of a method of migrating macros between applications.

FIG. 12 is a flow diagram giving an overview of an example of the operation of the prepare function, which can take the place, for example, at step 102 of FIG. 1.

At 330, the analysis step 100 is started.

At 332, the preparation controller 452 (the preparation wizard) prompts the user to identify the documents to be analyzed and a location at which the analysis results are to be stored.

At 334, a first source document is selected.

At 336, the source document is copied to form a copy document.

At 338, the copy document is opened.

At 340, the copy document is analyzed by the source application macros in the source driver document for the document type concerned.

At 342, the results are recorded.

At 344, if the copy document is identified as having preparable (i.e. rectifiable migration issues) then the copy document is prepared to rectify the migration issues.

At 346, the copy document is closed.

At 348, if there is a next document to be analyzed and possibly prepared, then control returns to step 336. Otherwise the completion of the preparation is reported at 350.

Figure 11:
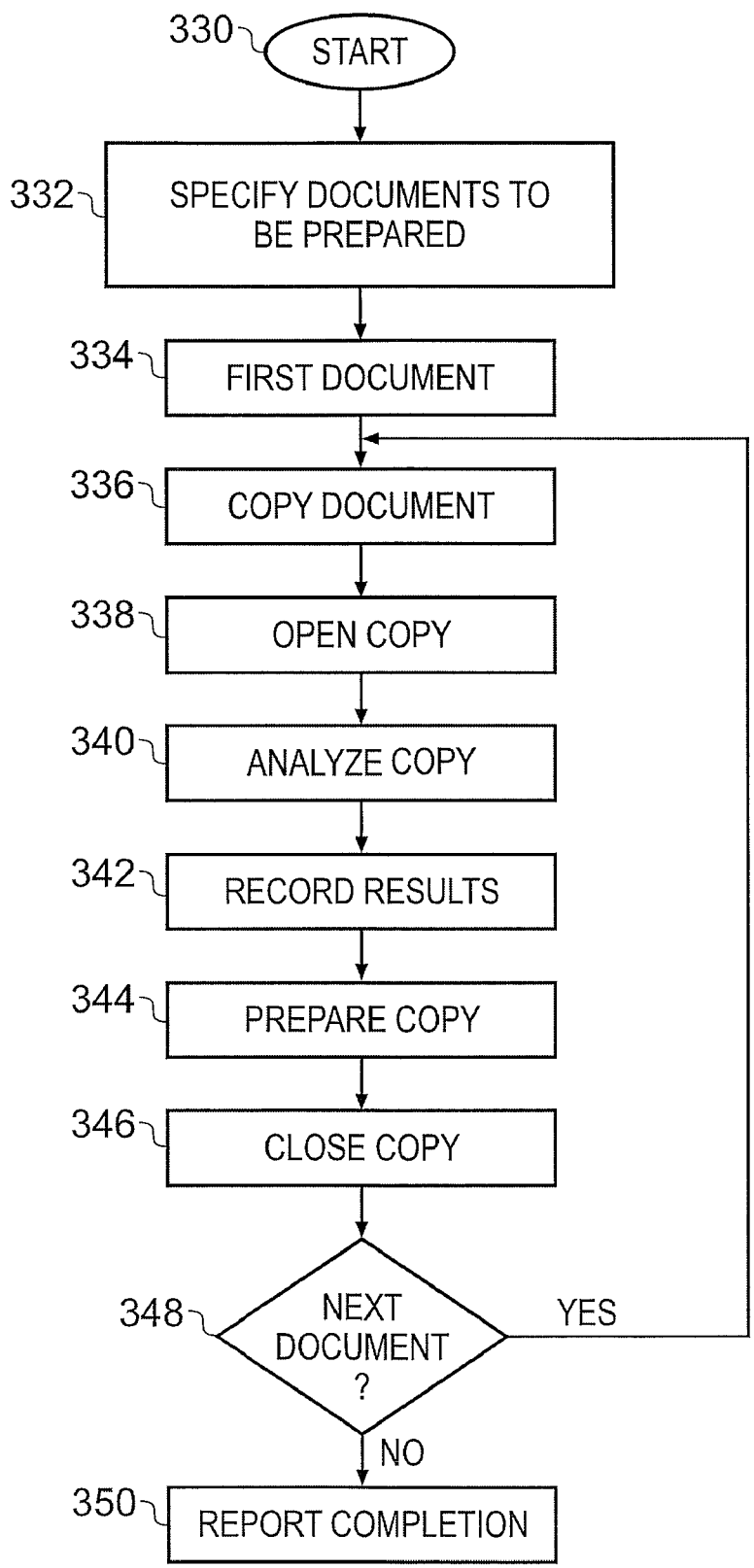
FIG. 11 is a flow diagram of an example of a method of analyzing and preparing documents to mitigate migration issues.

In the examples of FIGS. 10 and 11, therefore, each document that is found to have preparable issues can be subjected to preparation (i.e. it can be copied and modified) to rectify the migration issues before a next document is analyzed.

Table 2 below represents an example workflow for the analysis and preparation of source documents to mitigate migration issues. In this a Preparation and Analysis Wizard (PAW) forms an analysis/preparation controller 452. In this example, input parameters collected by the PAW are saved in a file called PAW install dir>\resources\<locale>\analysis.ini. An analysis/preparation driver module called AnalyzeDirectory( ) forms a controlling module 456 of the source driver document 454. A MigrationAnalyzer module 458 called DoAnalyze( ) forms an analysis module in the source driver document 454. A MigrationPreparation module called DoPreparation( ) forms a preparation module 460 in the source driver document 454.

TABLE 2

Start of Table 2
    PAW is launched
        Input Parameters for Analysis - user follows steps in wizard to specify document
            input directory, type of documents to process, results directory and name of
            results file.
        Run Analysis - refer to Analysis Workflow
            If any documents have migration issues detected during the analysis the
            prepare button is now enabled.
        Prepare
        User clicks on the prepare button
        A dialog is popped up informing the user that a preparation is going to be run
            on the analyzed documents which have preparation issues and the resultant
            prepared documents saved without altering the original source documents in
            any way.
        The input parameters for the preparation run are saved to an analysis.ini file in
            <PAW install dir>\resources\<locale>\analysis.ini, including a Prepare=True
            flag.
        For each document type which has preparable issues [determined by querying
            the results generated by the analysis] the PAW opens the appropriate driver
            document and invokes the AnalysisDriver module AnalyzeDirectory( ) sub.
        AnalyzeDirectory( )
            A parameter has been set by clicking on the Wizard Prepare button to
                indicate that the analysis driver is now running in Preparation mode as
                opposed to Analysis.
            This sub gets the input settings, determines the list of preparable documents
                to be analyzed and then analyzes and prepares each in turn by calling the
                MigrationAnalyzer module DoAnalyze( ) function, passing in a
                DocumentAnalysis object in which to store the analysis and preparation
                results for the document. The results for all the documents are stored in
                the AnalyzedDocs collection. The results are only used to determine the
                success of the preparation; they are not used to generate any output results
                as they are in analysis.
        DoAnalyze( )
            This function opens the document, determines its general document
                properties and then analyzes it for all of the Analysis issues, by calling
                the various Analysis functions both application specific and common.
                It stores the document information in the DocumentAnalysis object
                passed into it by the AnalyzeDirectory( ) sub. All of the analysis
                functions store all of the analysis issues detected in an IssuesInfo object
                and add it to the DocumentAnalysis objects Issues collection.
            An Analysis function, which detects an issue that can be prepared, has
                code added to the end of it that will call a DoPreparation( ) function
                when being run in Preparation mode [determined by calling
                InPreparation( ), which will return true in Preparation mode]. It will
                pass in the IssuesInfo object to the DoPreparation( ) function along with
                other data relevant to preparing the issue.
            DoPreparation( ) will invoke the specific Preparation( ) function for this
                issue. It will modify the in memory copy of the document in order to
                work around the analysis issue detected, always ensuring that the
                overall appearance of the document remains unaltered. If preparation
                succeeds a success code is returned, otherwise an appropriate error log
                entry is written out and a corresponding error code returned.
            When the analysis and preparation for a document is completed the
                document is saved out to a Prepare sub folder under the results
                directory location. The source document is then closed without saving
                any preparation changes. The source document is not altered in any
                way. At this point the function returns.
            As this is Preparation mode, after all of the documents have been analyzed
                and prepared the AnalyzeDirectory( ) does not need to write out any
                analysis results, it simply sets the appropriate return code and returns.
        Next preparable document type driver document is opened and its
            AnalyzeDirectory( ) sub invoked.
        All preparable document types have been analyzed and prepared.
        The user is informed by a popup dialog of the completion of the Preparation and
            the location of the prepared document copies.
    DAW is closed.
End of Table 2

Accordingly, by selecting the prepare button, an automatic preparation activity can be started for documents listed in the analysis results spreadsheet that have repairable issues. A query dialog can be presented to the user, telling the user what is about to happen and giving the user the option to click OK to proceed or Cancel to cancel the preparation. Once the preparation of the documents for migration has been completed, an information dialog can be displayed informing the user and telling the user where the prepared copies have been saved.

The prepare function can be operable, for example, to modify the headers in the case of a TOC header style with blank lines to achieve the correct formatting after migration. Similarly, action can be taken to modify headers and footers so that they do not become misplaced or out of shape during migration. The use of the prepare function can thereby automatically reduce the migration issues that might be encountered in a cost-effective manner.

An embodiment of the invention can provide a computer-implemented process for migrating a source document that includes source macros in a source language. FIG. 12 is a flow diagram giving an overview of such a process 300. Software can be provided for carrying out this process.

At 472 the source macro can be extracted from the source document using the destination application package (e.g., a VisualBasic macro could be extracted using StarOffice).

At 474, the source macro can be parsed. The software can be arranged, when parsing the source macro in step 304, to tokenize the source macro, to convert it to a syntax tree and then to an annotated semantic tree.

At 476, specific source APIs can be mapped to destination APIs. The software can be arranged, when mapping specific source APIs to destination APIs, to take the annotated semantic tree and generated symbol tables and to map specific source APIs to destination API calls or higher level destination APIs using a source to destination API mapping table. The mapping table can be arranged to map a subset of the source APIs to destination API calls or higher level destination APIs.

At 478, the destination macro code can be generated. The software can be operable to generate the destination macro code using the annotated semantic tree and the generated, or resolved, symbol table.

The software can further be operable to create an analysis of all API's used in the source macro, which could and could not be mapped and any errors that occurred in processing.

Figure 13:
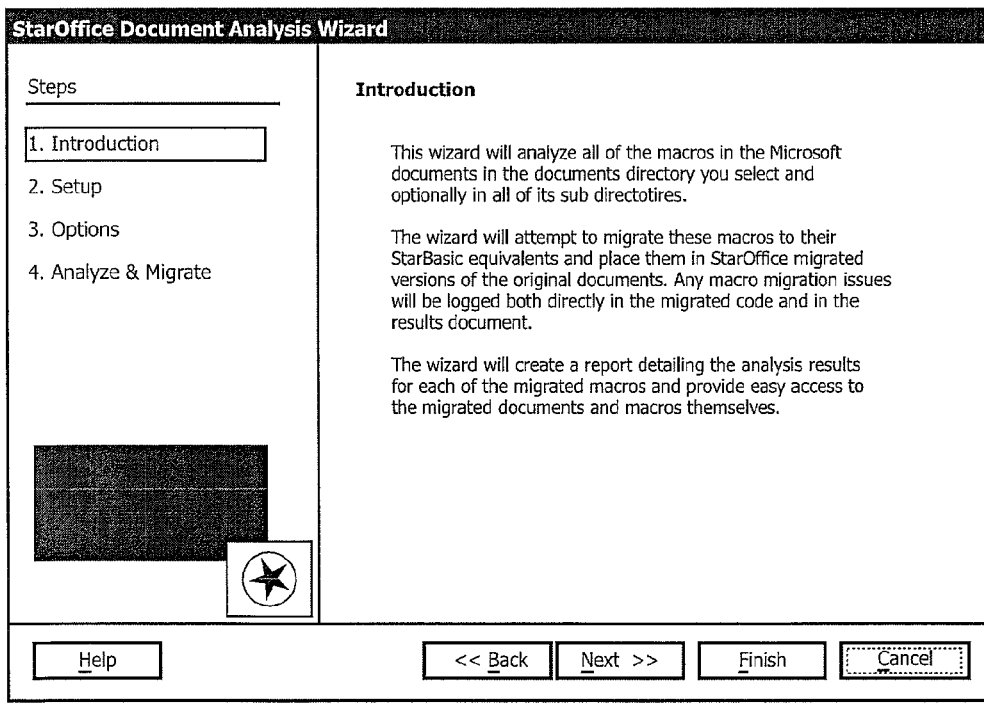
FIG. 13 illustrates example screenshots of macros before and after migration.

FIG. 13 illustrates example screenshots of macros before and after migration. Specifically, FIG. 13 illustrates a macro written in VisualBasic 482 and a corresponding macro in StarBasic 484, and an introduction screen 486 of a macro migration wizard for assisting in the process described with reference to FIG. 12

Figure 14:
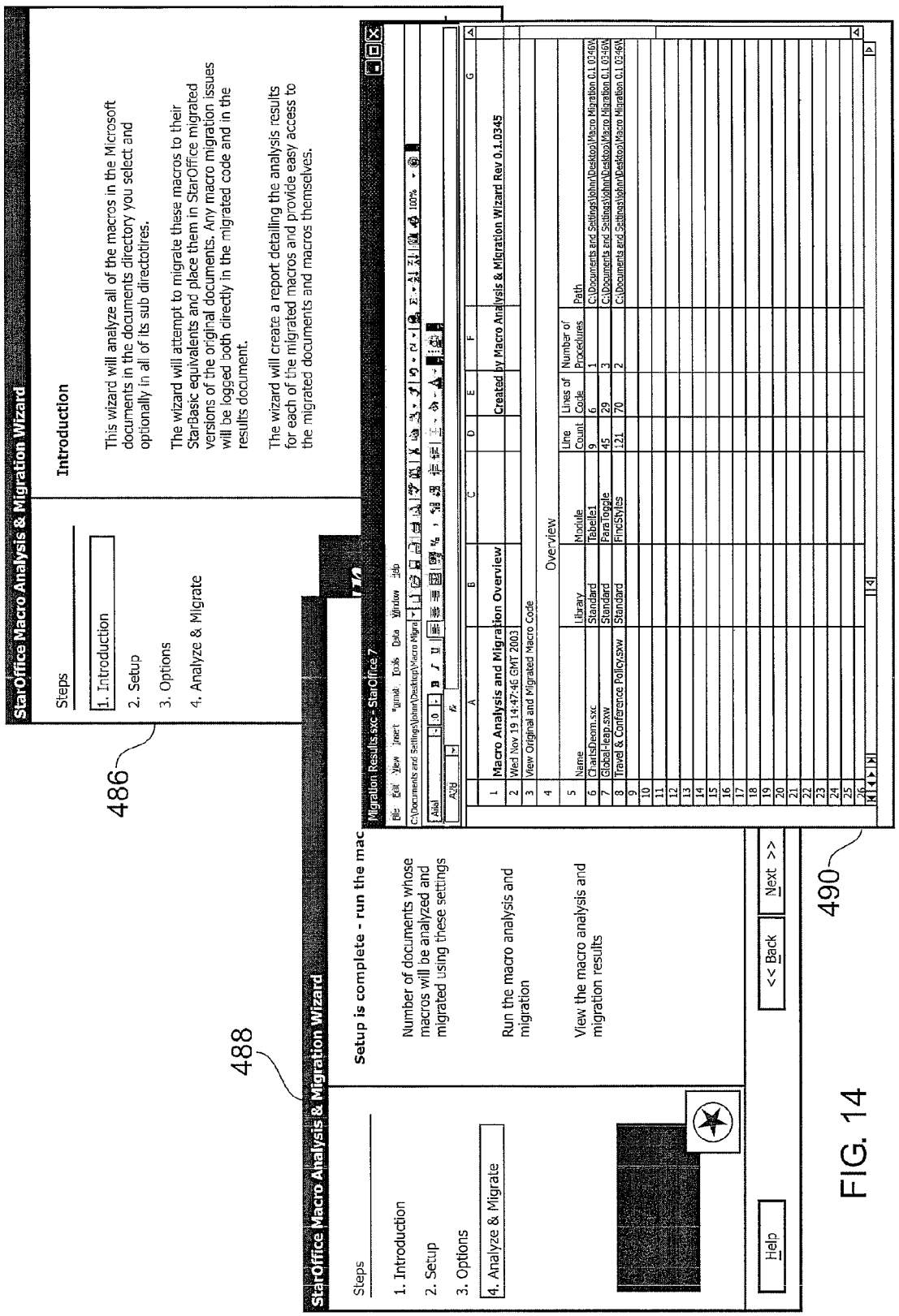
FIG. 14 illustrates example screenshots of an example of a wizard for use in the migration of macros.

FIG. 14 illustrates example screenshots of an example of a wizard for use in the migration of macros. Specifically, FIG. 14 illustrates an introduction screen 486 of a macro migration wizard, and a screen 488 reporting that setup is complete for macro migration, as well as an example of a macro analysis and migration overview screen 490 that can be output from the process described with reference to FIG. 12.

Figure 15:
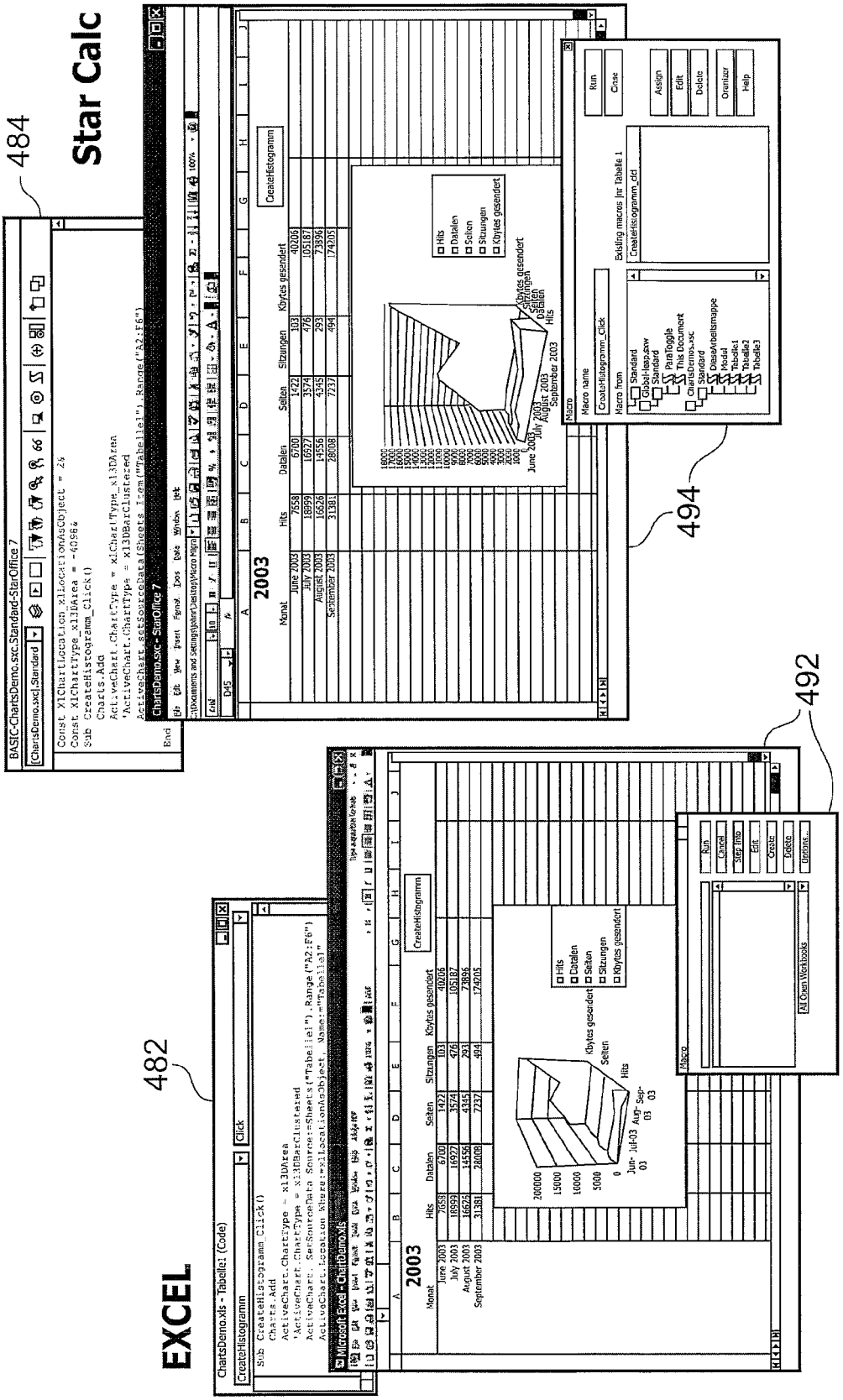
FIG. 15 illustrates example screenshots of the results of migrating macros.

FIG. 15 illustrates example screenshots of the results of migrating macros. Specifically, FIG. 15 illustrates the VisualBasic macro 482 of FIG. 13, as used in the context of an Excel spreadsheet represented at 492, as well as the StarBasic macro 484 of FIG. 13, as used in the context of an corresponding Star Calc spreadsheet represented at 494.

Figure 16:
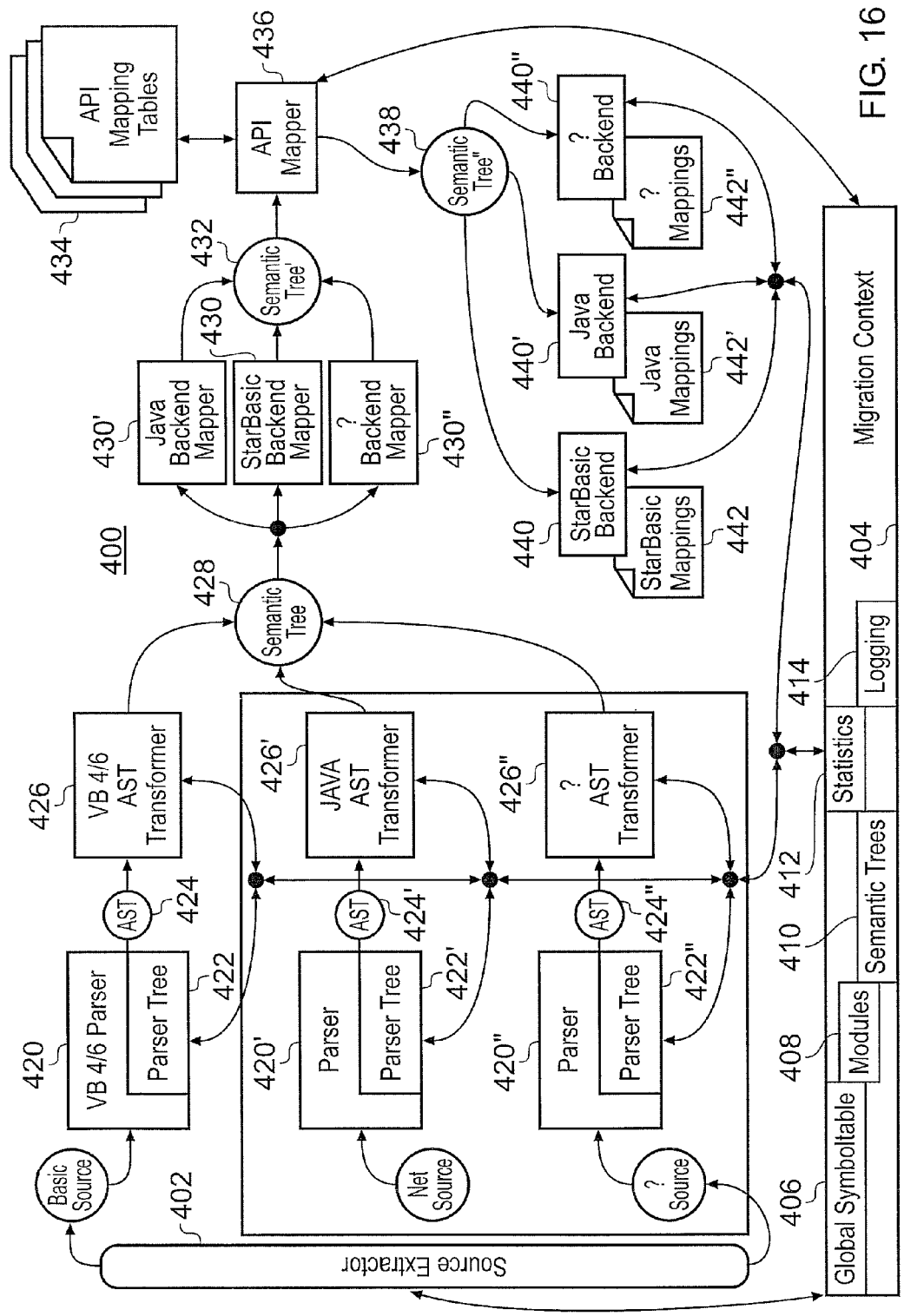
FIG. 16 is a schematic block diagram of a transformer for migrating macros.

FIG. 16 is a schematic block diagram illustrating functional components of a transformer 400 for enabling the migration of the source macros to destination macros in the process described with reference to FIG. 12.

The transformer 400 includes a number of functional components, or modules that will be described in the following.

A source extractor 402 forms a supplier of source code and pre-symbol-information. A migration context 404 includes an global symbol table 406 containing symbols for forms and other dependencies and can also include other modules 408, semantic trees 410, statistics files 412 and log files 414. The symbol table 406 can contain, after the migration, all declared and unresolved symbols. The semantic trees 410 are provided for solving types of expressions, collecting symbols and marking all unknown or unresolvable symbols. The modules 408 can include, for example, various back end modules 440. The transformer works with a so-called transformer context in which meta information is collected in the statistics file 412 during a transformation process. This information may be used to present statistics to a user after transformation. The logging file 414 can contain a log of the migration process.

In operation, the source extractor 402 supplies an array of instances of java.io.Reader for every module, and classmodule.

A parser 420 can operate on each macro given by the source extractor 402 to create an abstract syntax tree (AST) 424. This AST 424 is specific to the source macro language and/or the parser 420. The AST 424 contains syntactic information including formatting and remarks. The grammar for the parser 420 can be mapped as a cheated LL(1) grammar using Javacc. Javacc comes with a tool named jjtree which is able to create a parser tree 422. The parser tree 422 maps the original source into the AST 424. The parser can be operable to tokenize the source macro.

An AST transformer 426 uses the AST 424 generated by the parser 420 as an input to create a semantic tree 428, which can be held in the migration context at 410. The AST transformer 426 uses and updates the symbol table 406 contained in the migration context 404. The AST transformer 426 performs semantic analysis to enable type detection and to resolve invocation/field/array ambiguities and to build the semantic tree 428.

As represented in FIG. 11, different source languages can be accommodated by providing appropriate parsers 420', 420" and AST transformers 426', 420".

In the present example, the semantic tree 428 provides a substantially source language independent semantic representation. It is substantially source language independent as it covers the language capabilities of source language in a language independent way. The semantic tree could be updated as appropriate for other examples to accommodate other source languages.

In contrast to an abstract syntax tree (AST), the semantic tree 428 does not represent the syntactic information but rather represents a structure which is adapted to hold type information, references to the symbol table and a generalized view to the original program (respectively module, class, etc.). For example whereas a syntax tree holds a string for a date literal format, the semantic tree holds its actual value as a date object and its type. As a result, the back end processes do not need to know about the format source literals.

In order to preserve the original source formatting and comments, syntactic hints can be added to the semantic tree 428, such as the indentation of a statement, empty lines and comments. Other formatting aspects (e.g., a space between operators, parenthesis, commas, etc.) would be lost. The back end modules 440 are operable, however, to insert appropriate formatting in the destination code.

Back end mappers 430 (430', 430") can be provided, if required, to address situations where the back end modules 440 are unable to map parts of the semantic tree to corresponding destination code. In this case, the back end mappers 430 can be used to generate a modified semantic tree 432. This is a rare situation that might occur, for example, where the semantic tree is modified before the API mapper 436 applies any mappings.

If the semantic tree 428 supports features that are not supported in the destination language, such mappings can be performed in the back end mappers 430.

An example of a situation where a back end mapper 430 (430', 430") might be employed is illustrated below for a conversion from VisualBasic as the source language to StarBasic as the destination language.

In this example, it is noted that VisualBasic supports the use of a for-each loop such as:

Dim c as Collection
Set c=new Collection
Dim elem
. . .
For Each elem In c
Debug.Print elem
Next However, StarBasic does not support for-each loops, so that a conversion of the loop to a support form can be effected, for example to:

Dim i as Integer
For i=1 To c.Count
elem=c.Item(i)
Print elem
Next i

A StarBasic back end mapper 430 can be operable to convert the for-each loop in the semantic tree as illustrated and to replace the appropriate node.

The API mapper 436 is operable to map source language (e.g., Microsoft Office) API calls to destination language (here StarOffice) API calls. Where StarOffice is the destination language, this is a destination code independent action because the StarOffice API is the same for all supported source languages.

The API mapper 436 accesses multiple mapping tables 434 and changes the original semantic tree (or the modified semantic tree 432) so that a back end process can receive a semantic tree 438 which is converted to a StarOffice API compliant form. The mapping API tables 434 provide for direct code replacement of original API calls to wrapper code and provide independence of the destination language by providing for code replacement and complex code definition. Of course it is possible that no mapping was found for a certain API call. In that case one possible action is that the corresponding node in the semantic tree is marked. Another possible action is that a user interface is opened giving the possibility to enter an appropriate mapping for the found case, in which case the user's input can be stored in a separate mapping table.

As the mapping table contains Basic code in the destination mapping, and the API mapper 436 only receives semantic nodes to map, the API mapper 436 is provided with access to the parser 420, the AST transformer 426 and the StarBasic back end module 440.

Each back end module 440 receives as input a source language API-less semantic tree and creates appropriate destination code for a given kind of semantic tree. In the present example the destination code is output to a java.io.Reader. The back end module 440 can access the abstract syntax tree 424 to append comments before each original statement where destination code could not be created, for example because the destination language does not support certain features of the semantic tree (e.g. Classes). Back end module specific mapping tables 442 can be provided to define how the back end modules 440 are to convert parameters to create compliant destination code (e.g., StarBasic code) and how to convert file IO statements.

Error recovery can be provided for the components of the transformer in the event of errors. Typically, where errors are encountered, these will be reflected in appropriate log entries.

Figure 17:
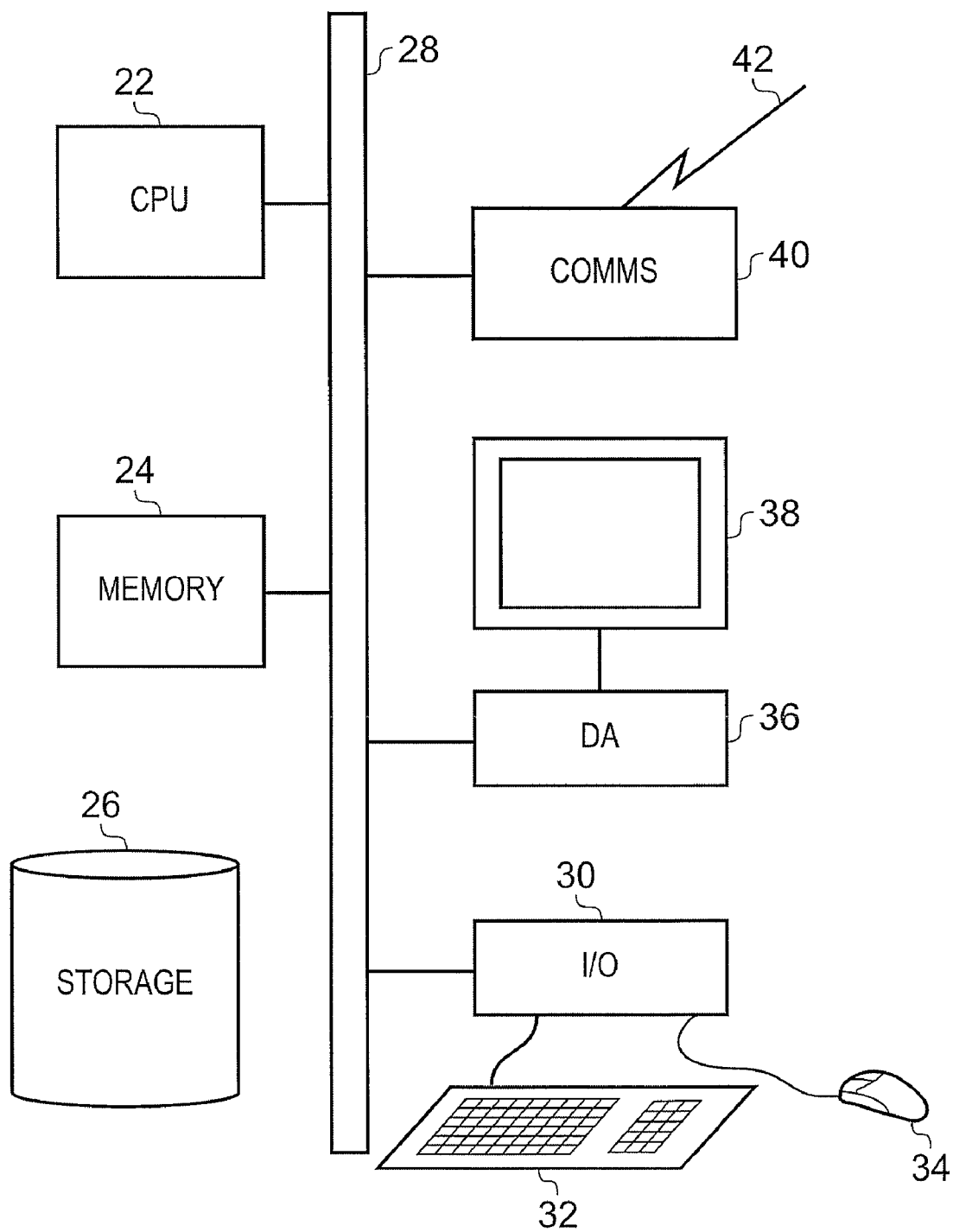
FIG. 17 is a schematic block diagram of elements of a computer system on which the present invention may be implemented.

FIG. 17 provides a schematic overview of the functional components of an example of a computer system 20 in which the present invention may be implemented. These functional components can include one or more processors 22, memory 24 and storage 26 interconnected via one or more buses and/or other internal connection system 28. The storage 26 can, for example, comprise a hard disk drive, CD-ROM and/or other mass storage devices. One or more user input devices such as a keyboard 32 and pointing device 34 may be connected to the internal connection system 28 via an I/O interface 30. Similarly, a display device 38 may be connected to the internal connection system 28 via a display adapter 36. A communication interface 40 can be provided for interfacing over a connections link 42 with an external network.

Accordingly, there has been described a method, apparatus and computer program product for analyzing for migration issues, and a source document set including one or more source documents to be migrated from a source application package to a destination application package. The migration issues can be reported to a user and/or resolved prior to migration by software. Software can also be provided for the extraction of a source macro from a source document, parsing of the source macro, mapping of specific source APIs to destination APIs and the generation of destination macro code.

Although particular embodiments of the invention have been described, it should be understood, that these are not intended to limit the invention to the particular form disclosed, but on the contrary, the invention is to cover all modifications, equivalents and alternatives falling within the spirit and scope of the present invention as defined by the appended claims.

What is claimed is:

1. A computer readable memory medium storing program instructions computer executable to:

perform an analysis of a source document compatible with a source application package to identify issues in migrating the source document to a destination application package, wherein the analysis is performed prior to migrating the source document to the destination application package;

generate a record corresponding to the identified issues;

automatically prepare the source document for migration based on the identified issues; and migrate the prepared source document to the destination application package;

wherein the source document is one of the following types of documents: word processing document, spreadsheet document, slide presentation document.

2. The computer readable memory medium of claim 1, wherein the program instructions executable to analyze the source document are executable to analyze one or more macros associated with the source document.

3. The computer readable memory medium of claim 1, wherein the program instructions executable to analyze the source document are executable to determine whether graphics or frames within the source document will become misplaced or misshapen during migration.

4. The computer readable memory medium of claim 1, wherein the source document is a word processing document, and wherein the program instructions executable to analyze the source document are executable to identify issues related to numbering in a table of contents of the source document.

5. The computer readable memory medium of claim 1, wherein the generated record indicates a cost associated with migrating the source document based on the identified issues.

6. The computer readable memory medium of claim 1, wherein the generated record includes information indicative of one or more identified macro migration issues or one or more document format migration issues.

7. The computer readable memory medium of claim 6, wherein the identified issues are grouped in the generated record according to issue complexity.

8. The computer readable memory medium of claim 1, wherein the source document is compatible with a format of a Microsoft Office application, and wherein the source document is being migrated to a format compatible with a StarOffice application.

9. A computer-implemented method comprising:
a computer device performing an analysis of a source document compatible with a source application package to identify issues in migrating the source document to a destination application package, wherein the analysis is performed prior to migrating the source document to the destination application package;
the computer device generating a record corresponding to the identified issues;
the computer device automatically preparing the source document for migration based on the identified issues; and
the computer device migrating the prepared source document to the destination application package;
wherein the source document is one of the following types of documents: word processing document, spreadsheet document, slide presentation document.

10. The method of claim 9, wherein the analyzing includes analyzing one or more macros associated with the source document.

11. The method of claim 9, wherein the analyzing includes determining whether graphics or frames within the source document will become misplaced or misshapen during migration.

12. The method of claim 9, wherein the source document is a word processing document, and wherein the analyzing includes identifying issues related to a numbering in a table of contents of the source document.

13. The method of claim 9, wherein the generated record indicates a cost associated with migrating the source document based on the identified issues.

14. The method of claim 9, wherein the generated record includes information indicative of one or more identified macro migration issues or one or more document format migration issues.

15. The method of claim 14, wherein the identified issues are grouped in the generated record according to issue complexity.

16. The method of claim 9, wherein the source document is compatible with a format of a Microsoft Office application, and wherein the source document is being migrated to a format compatible with a StarOffice application.

17. A computer system comprising:
one or more processors;
a memory storing program instructions executable by the one or more processors to:
perform an analysis of a source document compatible with a source application package to identify issues in migrating the source document to a destination application package, wherein the analysis is performed prior to migrating the source document to the destination application package;
generate a record corresponding to the identified issues;
automatically prepare the source document for migration based on the identified issues; and
migrate the prepared source document to the destination application package;
wherein the source document is one of the following types of documents: word processing document, spreadsheet document, slide presentation document.

18. The computer system of claim 17, wherein the program instructions executable to analyze the source document are executable to analyze one or more macros associated with the source document.

19. The computer system of claim 17, wherein the program instructions executable to analyze the source document are executable to determine whether graphics or frames within the source document will become misplaced or misshapen during migration.

20. The computer system of claim 17, wherein the source document is a word processing document, and wherein the program instructions executable to analyze the source document are executable to identify issues related to a numbering in a table of contents of the source document.

21. The computer system of claim 17, wherein the generated record indicates a cost associated with migrating the source document based on the identified issues.

22. The computer system of claim 17, wherein the generated record includes information indicative of one or more identified macro migration issues or one or more document format migration issues.

23. The computer system of claim 22, wherein the identified issues are grouped in the generated record according to issue complexity.

24. The computer system of claim 17, wherein the source document is compatible with a format of a Microsoft Office application, and wherein the source document is being migrated to a format compatible with a StarOffice application.

* * * * *

UNITED STATES PATENT AND TRADEMARK OFFICE
CERTIFICATE OF CORRECTION

| | | |
|---|---|---|
| PATENT NO. | : 7,730,025 B1 | Page 1 of 1 |
| APPLICATION NO. | : 10/999597 | |
| DATED | : June 1, 2010 | |
| INVENTOR(S) | : John Michael Rice et al. | |

It is certified that error appears in the above-identified patent and that said Letters Patent is hereby corrected as shown below:

On the title page, item (75), in column 1, in "Inventors", line 1, delete "Bettytown" and insert -- Bettystown --, therefor.

On sheet 6 of 15, in Figure 6, line 25, delete "Powepoint" and insert -- Powerpoint --, therefor.

On sheet 6 of 15, in Figure 6, line 38, delete "Powepoint" and insert -- Powerpoint --, therefor.

On sheet 7 of 15, in Figure 7, line 8, delete "PowePoint" and insert -- PowerPoint --, therefor.

On sheet 11 of 15, in Figure 13, Ref. Numeral 486, line 5, delete "directotires." and insert -- directories. --, therefor.

On sheet 12 of 15, in Figure 14, Ref. Numeral 486, line 5, delete "directotires." and insert -- directories. --, therefor.

In column 5, line 48, after "archiving" insert -- . --.

In column 13, line 36, after "12" insert -- . --.

Signed and Sealed this
Second Day of August, 2011

David J. Kappos
*Director of the United States Patent and Trademark Office*